Patented June 7, 1938

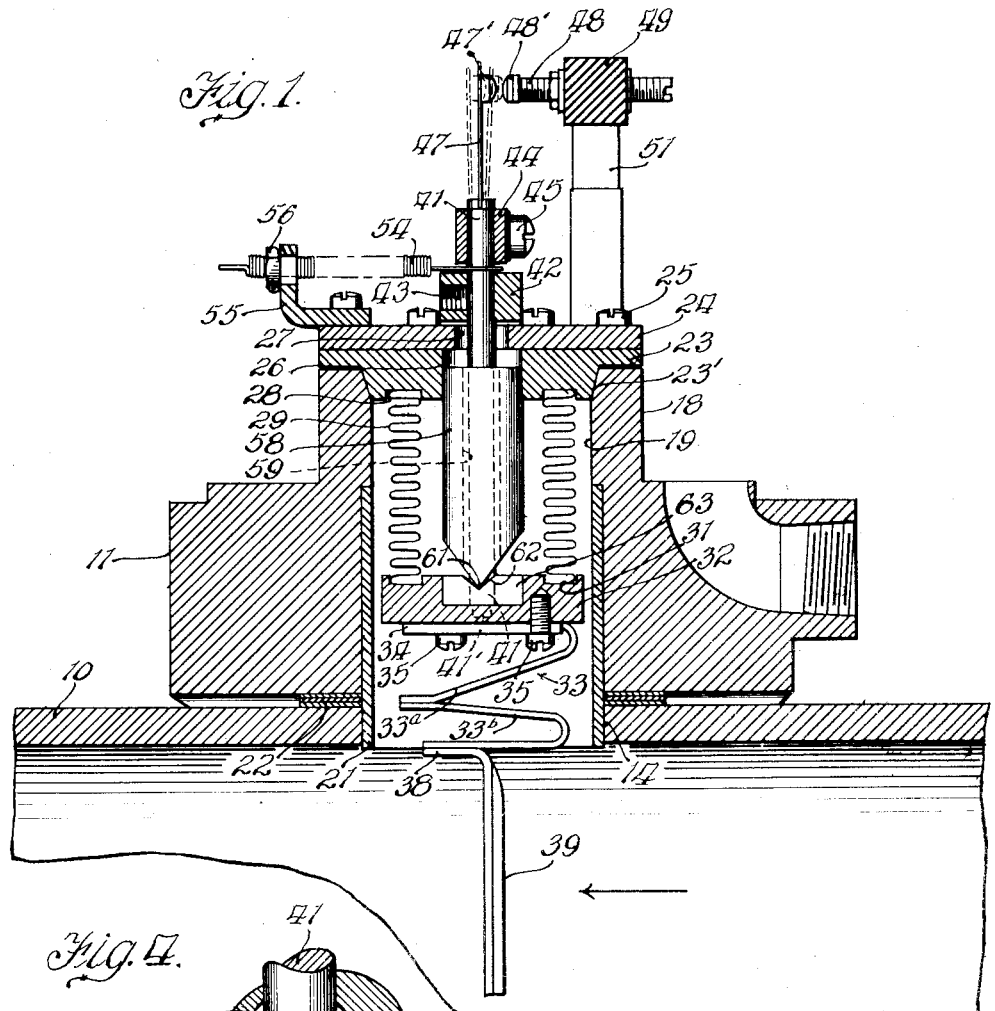
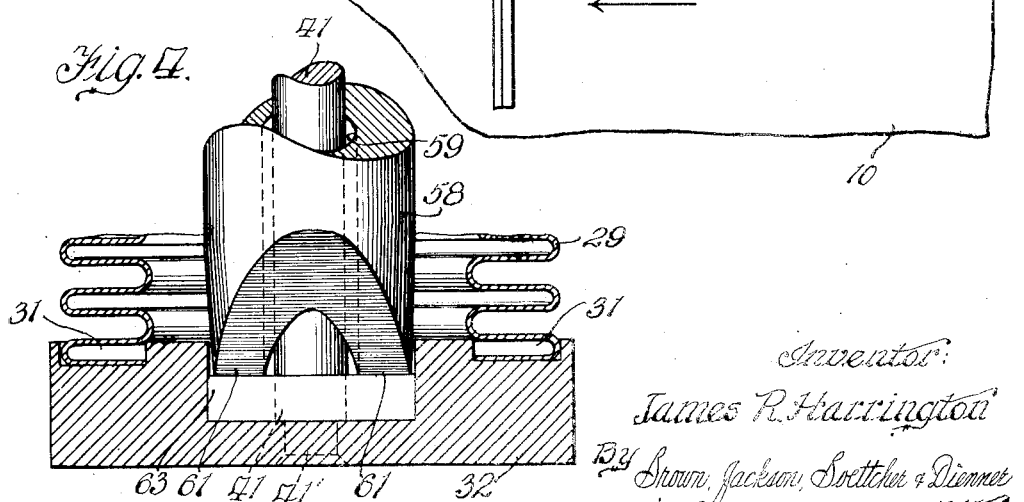

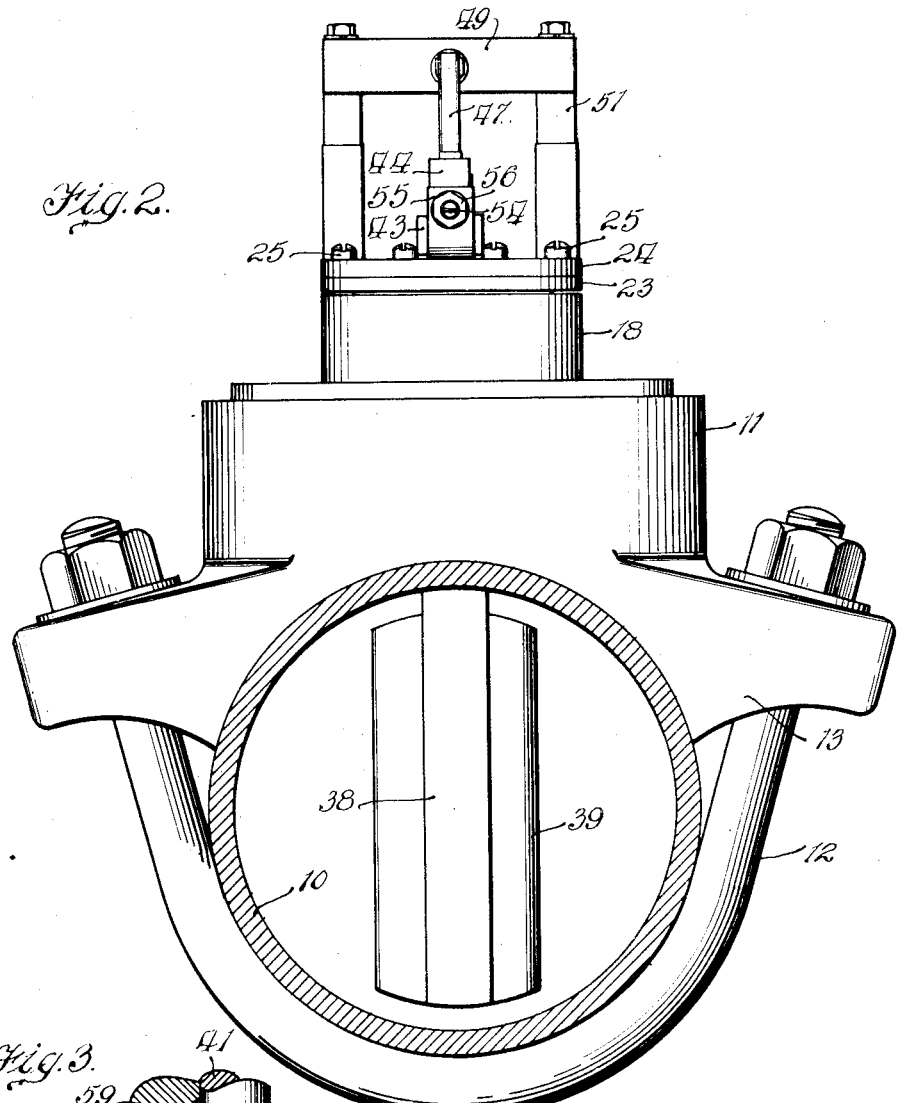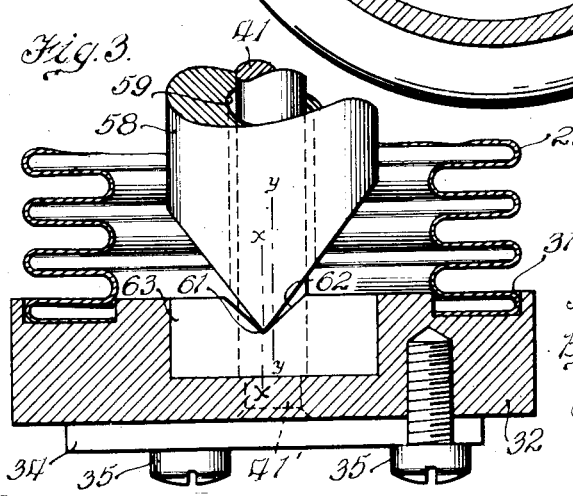

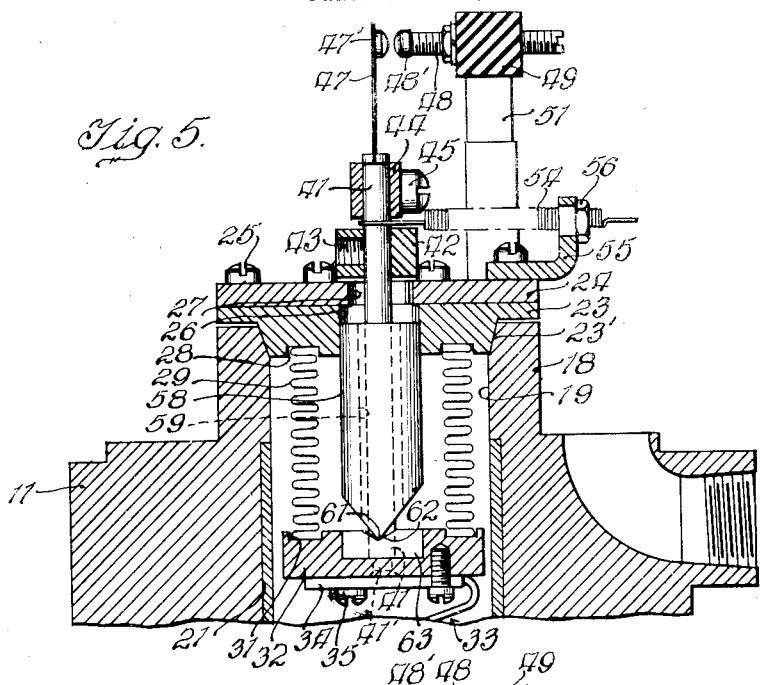
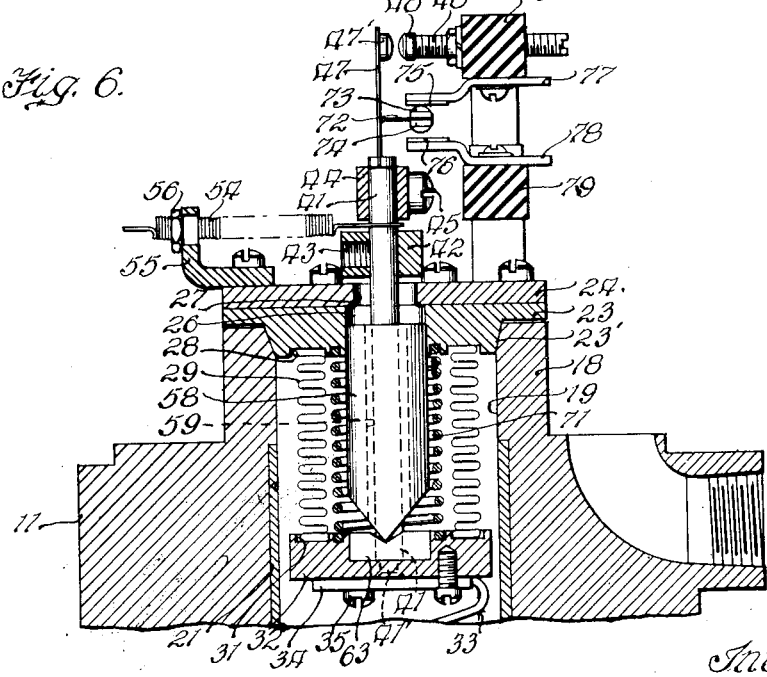

2,119,783

UNITED STATES PATENT OFFICE 2,119,783

FLOW AND PRESSURE RESPONSIVE INDICATOR

James R. Harrington, Mansfield, Ohio, assignor, by mesne assignments, to The Autocall Company, Shelby, Ohio, a corporation of Ohio Application January 18, 1936, Serial No. 59,796

31 Claims. (Cl. 200—81)

The present invention relates generally to devices for indicating the flow of fluid through a conduit, and/or for indicating the pressure of a fluid within a conduit or chamber. The invention has particular reference to indicators for sprinkler fire extinguisher systems, where the flow of water through the sprinkler pipes resulting from the opening of one or more sprinkler heads, or a drop of pressure within the conduit, causes the indicator to operate and control an electric circuit which sounds an alarm or performs any other desired indicating or control function. Inasmuch as this is the principal field of utility for which my invention has been devised, I shall describe it in this connection, although it will be understood that the invention is adaptable to use in other fields.

One of the objects of the invention is to provide an improved construction of flow indicator which will avoid false alarm indications in the event of surges, water hammer or other like disturbances arising in the system, which disturbances are an abnormal condition, but do not represent a flow condition such as should properly cause an alarm indication. For example, in installations where the sprinkler system has communication with hydraulic elevator apparatus, or large, quick-opening valves, pumps, etc., which are in frequent or intermittent service apart from fire prevention duties, these auxiliary devices frequently create heavy surges in the water pressure prevailing in the sprinkler system. The presence of air, which is almost always entrapped in appreciable quantities in these sprinkler systems, frequently results in these pressure variations causing an appreciable flow at the flow indicator. My improved indicator responds instantaneously to these pressure surges to establish a condition at the flow indicator such that a larger range of deflecting movement of the flow responsive element is necessary to cause an alarm indication during one of these pressure surges than is required under normal pressure conditions. Thus, the device compensates for abnormal pressure conditions so as to avoid false alarm indications.

A further object of the invention is to provide an improved indicator responsive to pressure in the conduit. In performing this function, the apparatus will indicate when the pressure has fallen to a point where normal operation of the system is not assured. One embodiment of my improved apparatus is operative to give one indication when the pressure has fallen below normal and to give another indication when the pressure has been restored to normal.

Other objects and advantages of my invention will appear from the following detail description of certain preferred embodiments of the invention. In the accompanying drawings illustrating such embodiments:

Figure 1 is a vertical sectional view through one embodiment;

Figure 2 is a view at right angles thereto, showing one preferred manner of attaching the apparatus to a conduit;

Figure 3 is a fragmentary detail view on a larger scale, showing the off-center relation of the fulcrum axis for the pressure head.

Figure 4 is a similar view at right angles thereto;

Figure 5 is a fragmentary view, similar to Figure 1, showing a modified arrangement which is responsive to static pressure conditions in the conduit; and Figure 6 is a similar view of another alternative arrangement also responsive to static pressure conditions in the conduit.

A typical section of pipe leading to a series of sprinkler heads is indicated at 10. My improved flow indicator comprises a housing 11, which may be formed with a short section of cylindrical conduit therein which is adapted to be bolted or threaded between coupling ends of the pipe 10; or the housing may comprise a yoke-shaped fitting adapted to be clamped over a hole which has been previously drilled in the pipe 10 at the top or other point thereof. In the exemplary embodiment illustrated, the latter construction is shown, suitable U-shaped bolts or like clamping means 12 securing the yoke portion 13 of the housing 11 over the aperture 14 formed in the pipe 10. A boss 18 extends upwardly from the yoke-shaped portion of the housing, and extending down through this boss and the body portion of the housing is a cylindrical bore 19. A sleeve or nipple 21 is fixedly secured in a counterbore in the bore 19 and extends down through the hole 14 in the pipe 10. Suitable packing washers 22 surround the sleeve 21 and establish a tight joint at the hole 14. The open upper end of the bore 19 is closed by a head 23 which preferably has a tapered plug portion 23' engaging a tapered seat at the upper end of the bore. A top plate or cap 24 is secured over the head 23, and cap screws 25 extend down through the cap 24 and head 23 and thread into tapped holes in the boss 18 for securing the head and cap in place. A central bore 26 in the head aligns with a central hole 27 in the cap.

Formed in the under side of the head 23 is an annular groove 28 in which the upper end of a circumferentially corrugated tube 29 is soldered or otherwise secured in a manner to establish a hermetic seal. The circumferentially corrugated tube 29 is usually formed of copper, brass, bronze or other like metal, and possesses a considerable degree of flexibility and elasticity, such device being commonly known in the trade as a "sylphon". The lower end of said tube 29 is soldered or otherwise hermetically sealed in an annular groove 31 formed in the upper surface of a circular end head or mounting plate 32. Secured to the under side of this bottom head or disc 32 is a spring assembly 33 comprising upper U-shaped spring 33a and a lower U-shaped spring 33b, the adjacent ends of the two springs being suitably secured together, as shown. The top arm of the upper spring is secured to the mounting member 32 by a clip 34 which is fastened to the mounting member by the screws 35. The upper surface of the clip is provided with a channel groove therein, and the top arm of the spring is disposed in this groove, being securely clamped against the under side of the mounting member 32. The bottom arm of the lower spring 33b is secured to the horizontal arm of an L-shaped strap 38. The flow responsive baffle or deflecting member 39 is secured to the downwardly extending portion of this strap. The baffle is preferably formed with a slight transverse curvature, with the concave side thereof presented toward the pressure side of the normal direction of flow, this normal direction of flow being indicated by the arrow. When normal flow occurs in this direction, the baffle or vane 39 is deflected toward the left, transmitting a sidewise pressure through the spring assembly 33 to the bottom head 32 of the bellows chamber or sealing member 29. The flexibility inherent in this device enables the head 32 to be rocked about a fulcrum axis which I shall later describe. Such rocking motion is transmitted through a rod 41 to circuit controlling mechanism disposed above the top plate 24. The lower end of the rod 41 has a reduced portion 41' which is riveted within a central aperture in the head member 32. The rod extends up through the apertures 26 and 27 in the upper head and plate members, and has a stop collar 42 secured thereto by a set screw 43, this collar being spaced slightly from the top plate 24 and serving to limit any downward motion of the lower bellows head 32. A clamp fitting 44 is secured to the upper end of the rod 41 by a screw 45, and this fitting carries a contact spring 47 forming part of the circuit controlling mechanism. A contact button 47' on the upper end of said spring is adapted to engage with a contact button 48' on the contact carrying screw 48. The latter has insulated mounting in a block 49 supported on the upper end of fixed posts 51 rising from the top plate 24. In an open circuit type of contact mechanism, the movable contact button 47' will be spaced from the stationary contact 48' an appreciable distance, substantially as shown, when the baffle 39 is hanging pendant, uninfluenced by flow. This normal space between the two contact buttons can be adjusted by threading the screw 48 toward or away from the movable contact button. If desired, a tension spring 54 may have one end hooked around the rod 41 and its other end passed through an aperture in an L-shaped bracket 55 which is secured to the top plate 24, the provision of this spring not being essential, however, in this embodiment. A nut 56 threading over the convolutions of the spring 54 and bearing against the back of said bracket enables the tension of the spring to be adjusted. The spring may be employed to assure a definite spacing between the contacts 47' and 48' during normal or no-flow condition. If desired, the adjustment of the spring tension may be utilized to adjust the responsiveness of the device to different rates of flow.

Referring now to the arrangement whereby the indicator automatically compensates for abnormal surge conditions, the bellows chamber 29 is held against collapse under pressure by a fulcrum strut 58 which extends between the upper head member 23 of this chamber and the lower head member 32. In the preferred construction shown, this strut consists of a tubular member having a central bore 59 through which the rod 41 extends; the upper end of said tubular member being fixedly secured within the bore 26 of the end head 23. The lower end of said fulcrum member is beveled on opposite sides to produce a wedge-shaped conformation, as viewed in Figure 3. As viewed in Figure 4, this results in the two wedge-shaped ends 61, 61, located on opposite sides of the rod 41. These wedge-shaped ends seat in a wedge-shaped recess 62, the sides of which are slightly more obtuse than the wedge extremities 61 so as to permit rocking motion of the head member 32 relatively to the strut. The groove 62 is preferably formed in a block 63 of hard metal which is anchored in a recess in the top surface of the head member 32. Referring to Figure 3, attention is directed to the fact that the wedge extremities 61 and the bottom line of the recess 62 are unsymmetrical with respect to the head member 32, i. e., they establish a fulcrum axis located in a vertical plane $x$—$x$ which is spaced to the left from the central plane $y$—$y$ passing down through the center of the head member 32. This results in said head member being unbalanced in area with respect to the fulcrum axis $x$—$x$, a greater area of said head member being disposed to the right of said fulcrum axis than to the left thereof. Hence, the pressure of the water in the system tends to cock the head member about said fulcrum axis, tending to swing the righthand side upwardly by reason of the greater area of this side. The parts are so proportioned and adjusted that when the system is subjected to its normal static pressure the head member 32 will stand substantially in the position shown, with the rod 41 extending substantially vertically through the center of the aperture 27 in the top plate 24. However, upon the development of a heavy surge pressure in the system, the head member 32 will be rocked counterclockwise about the fulcrum axis, swinging the rod 41 to the left and increasing the space between the contact buttons 47', 48', substantially as illustrated in dotted lines. The rise in pressure will precede any appreciable flow when such a surge condition develops, and hence the spacing between the contacts will be increased before any consequent surge flow can act on the baffle 39. By reason of the greater spacing established between the contacts, the momentary flow of the surge will be incapable of causing engagement of the contacts, having to overcome the greater distance between the contacts and also having to overcome the effect of the surge pressure tending to maintain the bellows head 32 tilted laterally. When the surge pressure subsides and the system is back to its normal pressure, the head 32 resumes its normal position and the movable contact 47' likewise resumes its normal position, whereupon any normal flow in the direction of the arrow is operative to deflect the head and bellows chamber for swinging the contact 47' into engagement with the stationary contact 48', substantially as illustrated in dash and dot lines. The fulcrum axis *x—x* may be spaced a greater or lesser distance from the central axial plane *y—y* for increasing or decreasing the sensitivity of the device to surge pressures, depending upon conditions encountered in different installations. In the assembly of the device, the metallic bellows 29 is placed under a slight tensional stress so as normally to hold the V-shaped recess 62 pressed up against the wedge shaped extremities 61. The bellows possesses an inherent elasticity which will tend to retain the rod 41 in the normal position illustrated in full lines. If desired, the strut 58 may be arranged to have a fulcrum action at its upper end as well, as by forming wedge extremities at this upper end seating in V-shaped recesses in the upper head 23, substantially as previously described of the parts 61, 62, such upper fulcrum axis also preferably being offset to the left of the vertical axial plane *y—y*.

In Figure 5 I have illustrated a modified arrangement wherein the device is made responsive to static pressure changes in the conduit. In this arrangement, the tension spring 54 is merely transposed to the other side of the actuating rod 41. This merely involves transferring the bracket 55 to the other side for attachment by one of the diametrically opposite screws 25. In this position, the tension of the spring 54, which tension is adjustable, tends to swing the actuating rod to the right for closing the signaling circuit through the contacts 47' and 48'. This normal tendency of the spring is resisted by the static fluid pressure in the conduit acting on the pressure head 32. By reason of the off-center pivotal mounting of said pressure head, this static pressure, when normal or substantially normal, functions to hold the actuating rod in its open circuit position. However, should this static pressure decrease appreciably, the tension of the spring 54 serves to swing the actuating rod to the right for closing the circuit between the contacts 47' and 48', thereby causing an alarm indication to show that there is an abnormal condition in the system. When normal pressure is restored to the system, the actuating rod resumes its normal, open circuit position. This embodiment compensates for surge pressures in the same manner previously described, the pressure head 32 of the flexible wall 29 cocking in a counterclockwise direction under these surge pressures for increasing the spacing between the contacts 47' and 48'. While I deem it preferable to have the contacts in open circuit relation under normal conditions, it is within the purview of my invention to reverse this relation so that the contacts will be in engagement during normal conditions, the signal indication then being effected by the opening of the signaling circuit.

In Figure 6 I have illustrated another alternative arrangement which is also responsive to static pressures in the conduit. In this embodiment the signal indications denoting a normal static pressure in the conduit or denoting an abnormally low pressure therein, are transmitted over circuit connections separate from the circuit connections over which flow indications are transmitted. A compression spring 71 is enclosed within the expansible bellows 29, one end of said spring bearing against the fixed upper head 23 and the other end bearing against the movable pressure head 32. Under normal pressure conditions, the wedge-shaped recesses 62 are maintained pressed up against the wedge-shaped ends 61 of the strut 58. If the fluid pressure within the conduit falls below a predetermined point, the pressure of the spring 71 is effective to elongate the expansible bellows, thrusting the pressure head 32 and the actuating rod 41 downwardly. This downward motion is utilized to control circuit connections over which pressure indications are transmitted. To this end, a second contact spring 72 is attached to the clamp fitting 44, this second spring having a laterally bent upper end carrying contacts 73 and 74 on its upper and lower sides. Cooperating stationary contacts 75 and 76 are carried by suitable conductor arms 77 and 78 fastened to the insulated mounting blocks 49 and 79. The setting of the adjustable stop collar 42 on the actuating rod 41 determines the distance that the pressure head and actuating rod can be thrust downwardly by the spring 71, this setting being established so that the wedge-shaped seats 62 will always reengage properly with the wedge-shaped fulcrum extremities 61 when normal pressure conditions are restored on the system. The downward motion of the pressure head, resulting from a decrease of pressure, can be arranged to open a circuit between the contacts 73 and 75, or to close a circuit between the contacts 74 and 76, or to perform both of these switching operations. When both sets of contacts are employed, one circuit may be arranged to transmit a signal indication that the pressure is low at the point where the indicator is installed, and the other circuit may be used to transmit a signal indicating that the trouble has been corrected by the restoration of the normal pressure. It will be understood that this embodiment responds to flow and surge conditions in the same manner previously described of the embodiment illustrated in Figures 1 to 4, inclusive. In any lateral motion of the actuating rod 41, responsive to surge or flow conditions, the contact 73 merely slides or wipes along the relatively large area of the contact 75 without disturbing the closed circuit relation between these contacts.

In each of the above described embodiments, the position of the rod 41 and the contact or contacts carried thereby affords a visual indication of the flow or pressure conditions within the conduit.

While I have illustrated and described what I regard to be the preferred embodiments of my invention, nevertheless it will be understood that such are merely exemplary and that numerous modifications and rearrangements may be made therein without departing from the essence of the invention.

I claim:—

1. In apparatus of the class described, the combination with a fluid conduit, of a flow responsive member in said conduit, contact mechanism responsive to motion of said flow responsive member, and a pressure responsive member mounted to have tilting movement in response to pressure conditions in said conduit, said flow responsive member transmitting motion to said contact mechanism through said pressure responsive member.

2. In apparatus of the class described, the combination with a fluid conduit, of a pressure responsive member mounted to have tilting movement in response to pressure conditions in said conduit, a switch, switch actuating means responsive to the movement of said pressure responsive member, and a flow responsive member connected with said pressure responsive member and operative to actuate the latter.

3. In apparatus of the class described, the combination with a fluid conduit, of a member responsive to pressure in said conduit and arranged to tilt about an axis spaced from the center of said member, electrical contact means responsive to tilting motion of said member, and a flow responsive device in said conduit connected with said pressure responsive member and operative to tilt the latter.

4. In apparatus of the class described, the combination with a fluid conduit, of a member responsive to pressure in said conduit and arranged to tilt about an axis spaced from the center of said member, electrical contact means responsive to tilting motion of said member, and a flow responsive device in said conduit operatively connected with said pressure responsive member, said flow responsive device operating in response to normal fluid flow through said conduit to tilt said member in a direction opposite to the direction in which pressure increase tends to tilt said member.

5. In apparatus of the class described, the combination with a fluid conduit, of a flow responsive device in said conduit, electrical switch means comprising a pair of normally spaced contacts arranged to be moved into engagement by the actuation of said flow responsive device, and means responsive to pressure conditions in said conduit for controlling the spacing between said contacts.

6. In apparatus of the class described, the combination with a fluid conduit, of a flow responsive device in said conduit, an actuating member connected with said flow responsive device and adapted to be actuated thereby, electrical switch means comprising a pair of normally spaced contacts, said actuating member being operative to move one of said contacts into engagement with the other in response to motion of said flow responsive device, and a pressure responsive member mounted to have tilting movement in response to pressure conditions in said conduit and operative to control the spacing between said contacts.

7. In apparatus of the class described, the combination with a fluid conduit, of a housing connected with said conduit, a member responsive to pressure in said conduit and having flexible connection with said housing, reaction means cooperating with said pressure responsive member whereby the latter is caused to tilt laterally in response to pressure changes in said conduit, electrical switch means responsive to tilting motion of said pressure responsive member, and a flow responsive device in said conduit connected with said pressure responsive member, said flow responsive device operating in response to normal fluid flow through said conduit to tilt said member in a direction opposite to the direction in which pressure increase tends to tilt said member.

8. In apparatus of the class described, the combination with a fluid conduit, of a housing connected with said conduit, a flexible bellows attached to said housing and carrying a head responsive to pressure in said conduit, fulcrum means coacting with said head whereby pressure increase in said conduit tends to tilt said head, contact means responsive to tilting motion of said head, and a flow responsive device in said conduit connected to tilt said head.

9. In apparatus of the class described, the combination with a fluid conduit, of a housing connected with said conduit, a flexible bellows attached to said housing and carrying a head responsive to pressure in said conduit, fulcrum means coacting with said head whereby pressure change in said conduit tends to tilt said head, a flow responsive device in said conduit connected with said head for causing tilting motion of the latter, and spring means for influencing the tilting motion of said head.

10. In apparatus of the class described, the combination with a fluid conduit, of a housing connected with said conduit, an expansible bellows chamber having one end secured to said housing, a head secured to the other end of said bellows chamber and responsive to pressure in said conduit, fulcrum means within said bellows chamber and coacting with said head to establish a tilting axis for said head spaced from the center thereof, an actuating member connected with said head to tilt laterally therewith, contact means responsive to the tilting motion of said actuating member, and a flow responsive vane in said conduit operatively connected with said head.

11. In apparatus of the class described, the combination with a fluid conduit, of a housing connected with said conduit, an expansible bellows chamber having one end secured to said housing, a head secured to the other end of said bellows chamber and responsive to pressure in said conduit, a strut within said bellows chamber having one end secured to said housing and the other end formed with a V-shaped fulcrum edge, said fulcrum edge contacting with said pressure head along a fulcrum line spaced laterally from the center of said head, an actuating member connected with said head to tilt therewith, and contact means responsive to the tilting motion of said actuating member.

12. In apparatus of the class described, the combination with a fluid conduit, of a housing connected with said conduit, an expansible bellows chamber having one end secured to said housing, a head secured to the other end of said bellows chamber and responsive to pressure in said conduit, a strut within said bellows chamber having one end secured to said housing and having a V-shaped fulcrum edge at its other end, a V-shaped seat in said pressure head in which the V-shaped fulcrum edge of said strut seats, the fulcrum line of said seat and said fulcrum edge being spaced laterally from the center of said pressure head, a flow responsive vane in said conduit operatively connected with said pressure head, and contact means responsive to the tilting motion of said pressure head.

13. In apparatus of the class described, the combination with a fluid conduit, of circuit controlling means, a pressure responsive member adapted to operate said circuit controlling means to perform a circuit controlling function in response to change of pressure in said conduit, and a flow responsive member adapted to operate said circuit controlling means to perform a circuit controlling function in response to flow through said conduit.

14. In apparatus of the class described, the combination with a fluid conduit, of a housing connected with said conduit, an expansible bellows chamber having one end secured to said housing, a head secured to the other end of said bellows chamber and responsive to pressure in said conduit, fulcrum means coacting with said pressure head to establish a tilting axis for said head spaced from the center thereof, an actuating member connected with said head to tilt laterally therewith, a flow responsive vane in said conduit operatively connected with said head, a spring tending to cause said actuating member to tilt laterally in one direction, and contact means responsive to the tilting motion of said actuating member.

15. In apparatus of the class described, the combination with a fluid conduit, of a housing connected with said conduit, an expansible bellows chamber having one end secured to said housing, a pressure head secured to the other end of said bellows chamber and responsive to pressure in said conduit, a flow responsive vane in said conduit operatively connected with said pressure head to tilt the latter, spring means tending to expand said bellows chamber, and contact means responsive to the tilting motion of said pressure head and responsive to the expansion of said bellows chamber.

16. In apparatus of the class described, the combination with a fluid conduit, of a housing connected with said conduit, a pressure responsive member movably mounted in said housing and adapted to respond to pressure conditions in said conduit, a flow responsive member in said conduit connected with said pressure responsive member and operative to actuate the latter, and contact mechanism arranged to be actuated by said pressure responsive member in response to change of pressure in said conduit, and arranged to be actuated by said flow responsive member through said pressure responsive member upon fluid flow through said conduit.

17. In apparatus of the class described, the combination with a fluid conduit, of a flow actuated device in said conduit movable in either direction from a normal position, circuit controlling means adapted to respond to the motion of said flow actuated device, and means governed by the pressure in said conduit for varying the responsiveness of said circuit controlling means to the motion of said flow actuated device.

18. In apparatus of the class described, the combination with a fluid conduit, of a flow actuated device in said conduit, a rod arranged to be tilted laterally by the motion of said flow actuated device, circuit controlling means adapted to be operated by said rod, and means governed by the pressure in said conduit for governing the responsiveness of said circuit controlling means to the motion of said flow actuated device.

19. In apparatus of the class described, the combination with a fluid conduit, of a pressure responsive member mounted to have tilting movement in one direction in response to increases in pressure conditions in said conduit, a flow responsive member for tilting said pressure responsive member in the opposite direction, and switch means actuated by the tilting movement of said pressure responsive member in said opposite direction.

20. In a device for indicating the flow of fluid through a conduit, the combination of a housing connected with said conduit, a flexible substantially tubular sealing member, means mounting one end of said tubular member substantially against movement within said housing, the other end of said tubular member being capable of movement relatively to said fixed end, electrical contacts responsive to motion of said movable end, a flow responsive member within said conduit supported solely on the movable end of said tubular member, and means coacting with said tubular member whereby in the event of surge pressures in said conduit the motion transmitting relation between said flow responsive member and said electrical contacts is varied.

21. In apparatus of the class described, the combination with a fluid conduit, of a pressure responsive member biased to have movement in one direction in response to pressure conditions in said conduit, a flow responsive member in said conduit for imparting movement to said pressure responsive member in a different direction, and separate switch means controlled by movement of said pressure responsive member in each of said directions.

22. In combination with a fluid conduit, a pressure responsive member biased to move longitudinally in response to pressure variations in said conduit, switch means actuated by said movement of said member, a flow responsive member in said conduit for tilting said pressure responsive member in response to flow through said conduit, and switch means actuated by tilting movement of said pressure responsive member.

23. In combination with a fluid conduit, a pressure responsive member normally biased to tilt in one direction upon increases in pressure in said conduit, a switch comprising a pair of spaced contact means, means operable upon tilting of said pressure responsive member for actuating said switch, and a flow responsive member connected to said pressure responsive member and operable in response to flow for tilting said pressure responsive member in the opposite direction.

24. In combination with a fluid conduit subject to variations in fluid pressure therein independently of fluid flow therethrough, means for indicating fluid flow comprising a pair of normally spaced contacts, a control member for moving one of said contacts toward and away from the other of said contacts, means responsive to increases in pressure in said conduit for tilting said control member in one direction to increase the spacing of said contacts, and flow responsive means actuating said pressure responsive means to tilt said control member in the opposite direction.

25. In combination with a fluid conduit, a pair of spaced contacts, means responsive to decreases in static pressure in said conduit for closing said contacts, and means responsive to normal fluid flow in said conduit for closing said contacts.

26. In combination with a fluid conduit, a pair of spaced contacts, means responsive to variations in pressure in said conduit, selectively engageable with each of said contacts, a third contact, and means responsive to normal fluid flow in said conduit for actuating said pressure responsive means to engage said third contact.

27. In combination with a fluid conduit, a pair of spaced contacts, means responsive to decreases in static pressure in said conduit for closing said contacts, said means including means normally biasing said pressure responsive means in the opposite direction to increase the spacing of said contacts upon occurrence of surge pressures in said conduit, and means responsive to fluid flow in said conduit for moving said pressure responsive means into contact closed position.

28. In combination, a fluid conduit, a pair of spaced contacts, one contact being movable, pressure responsive means communicating with said conduit and normally biased to spread said contacts upon increases in pressure, resilient means assisting said last-named means, and flow responsive means in said conduit for overcoming said bias and said assisting means to close said contacts upon normal fluid flow through said conduit.

29. In combination, a fluid conduit, a pair of spaced contacts, one contact being movable, pressure responsive means communicating with said conduit and normally biased to spread said contacts upon increases in pressure, resilient means biasing said pressure responsive means to close said contacts upon decreases in static pressure in said conduit, and means responsive to flow in said conduit for closing said contacts.

30. Apparatus for indicating fluid flow in a conduit comprising a stationary contact, a second contact normally spaced therefrom, laterally tiltable means responsive to pressure in said conduit for increasing the spacing of said contacts upon surge increases in pressure, and spring means engaging said pressure responsive means for closing said contacts upon decreases in static pressure in said conduit, said pressure responsive means being normally biased toward contact opening position.

31. In apparatus of the class described, the combination with a fluid conduit, of circuit controlling means, a pressure responsive member adapted to operate said circuit controlling means to perform a circuit controlling function in response to change of pressure in said conduit, a second circuit controlling means, and a flow responsive member adapted to operate said second circuit controlling means in response to flow through said conduit, said flow responsive member transmitting motion through said pressure responsive member.

JAMES R. HARRINGTON.